United States Patent [19]

Sieving et al.

[11] 4,274,680
[45] Jun. 23, 1981

[54] SELECTIVE ANTI-SPIN BRAKE SYSTEM

[75] Inventors: Alfred W. Sieving, Venedy; James M. Stanley, Oreana, both of Ill.

[73] Assignee: Caterpillar Tractor Co., Peoria, Ill.

[21] Appl. No.: 108,971

[22] PCT Filed: Aug. 13, 1979

[86] PCT No.: PCT/US79/00597
§ 371 Date: Aug. 13, 1979
§ 102(e) Date: Aug. 13, 1979

[87] PCT Pub. No.: WO81/00384
PCT Pub. Date: Feb. 19, 1981

[51] Int. Cl.³ ............................................. B60T 13/22
[52] U.S. Cl. ................... 303/6 A; 303/6 M; 303/71; 188/170
[58] Field of Search ............ 303/71, 9, 6 M, 6 A, 303/6 R, 10, 50, 52; 188/170, 16, 354

[56] References Cited
U.S. PATENT DOCUMENTS

| 2,987,886 | 6/1961 | Deering et al. | 60/52 |
| 3,680,583 | 8/1972 | Clair | 137/106 |
| 3,807,447 | 4/1974 | Masuda | 137/596.13 |
| 3,834,769 | 9/1974 | Just | 303/6 R |
| 3,917,037 | 11/1975 | Prillinger | 188/170 |
| 3,957,315 | 5/1976 | Cummins et al. | 188/170 X |
| 4,057,297 | 11/1977 | Beck et al. | 188/170 X |

FOREIGN PATENT DOCUMENTS 2704662 7/1978 Fed. Rep. of Germany .......... 303/6 A

Primary Examiner—Douglas C. Butler
Attorney, Agent, or Firm—J. W. Burrows

[57] ABSTRACT

A hydraulic fluid brake system having a differential lock causes all of the torque from the engine to be delivered to the non-spinning wheel resulting in overloading of the components. By providing a non-locking differential (54) and a hydraulic fluid brake system (10), a controlled braking of the spinning wheel will provide a torque to the non-spinning wheel substantially equal to the torque from the braking of the spinning wheel and not allow the spinning wheel to be fully braked. The operator can selectively move a valve member (26) and maintain a modulated source of pressure (20) to the non-spinning wheel and controllably modulate the fluid pressure at the spinning wheel, thus controlling the braking effect of the brake on the spinning wheel. This arrangement controls the torque and eliminates harsh braking of an individual wheel.

6 Claims, 1 Drawing Figure

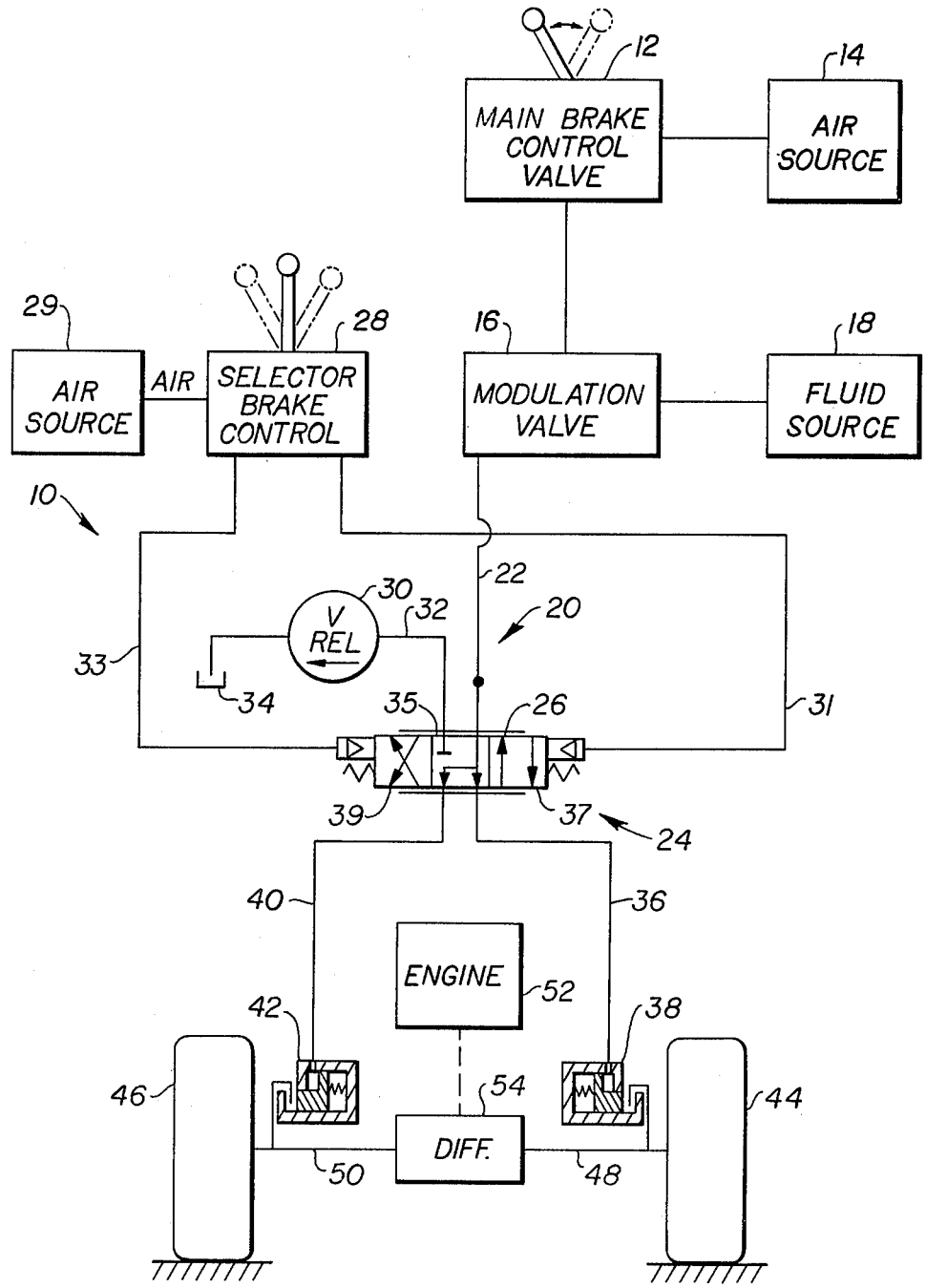

SELECTIVE ANTI-SPIN BRAKE SYSTEM

DESCRIPTION

Technical Field

This invention relates to an anti-spin brake system which allows the operator to control each wheel of a hydraulic fluid brake in order to limit wheel spin.

Background Art

Vehicles having automatic differential locks causes the differential gears, axles, wheel spindles, etc. of one wheel to be subjected to high torque loads when the other wheel is experiencing a loss of traction resulting in full torque being applied to the wheel with full traction. This may result in early failure of these components due to the higher torque loads.

Some have overcome this problem by using a standard differential and providing a hydraulic pump coupled to each wheel to automatically sense a change in speed of the two wheels and act on a differential valve which in turn delivers a fluid to apply the brake on the wheel that is spinning, thus causing the spinning wheel to turn substantially at the same rate as the non-spinning wheel. Even though this arrangement allows the torque to be split between the wheels, it is a rather expensive and complex system.

Another attempt at solving this problem was to use a standard differential and spring applied, pressure released brakes and selectively vent the pressure from each brake thus fully applying the brake of the wheel that is spinning. This caused a harsh braking action and could also result in the vehicle veering quickly if the brake of one wheel was accidentally applied by the operator.

DISCLOSURE OF INVENTION

The invention overcomes one or more of the problems set forth above.

In one aspect of the present invention, a hydraulic fluid brake system having right and left brakes has a selectively modulatable source of fluid pressure and a valve means for selectively modulating the source of fluid pressure at each brake and individually controlling engagement of each brake.

BRIEF DESCRIPTION OF DRAWING

The drawing is a partial schematic and diagrammatic representation of an embodiment of the present invention.

BEST MODE FOR CARRYING OUT THE INVENTION

With reference to the drawing, a hydraulic fluid brake system 10 has a main brake control valve 12 for controllably directing pressurized air from an air source 14 to a modulation valve 16. The modulation valve 16 receives pressurized hydraulic fluid from a source of fluid pressure 18, controllably modulates the pressure in response to manual operation of main valve 12, and produces a resultant modulated source of fluid pressure 20. This resultant controlled fluid pressure 20 is passed from modulation valve 16, through conduit 22 and to valve means 24.

For a more thorough understanding of the modulation valve 16 and its operation and main valve 12, reference is made to U.S. Pat. No. 4,006,939 to Lawrence Francish Schexnayder, issued Feb. 8, 1977.

The valve means 24 is connected to the conduit 22 and receives the modulatable source 20. The valve means 24 can include, for example, a valve 26 of the infinitely variable type having three positions and a selector valve 28 for selective remote control of the valve 26 by receiving pressurized air from a source 29 and directing the air through valve 28 and conduits 31 and 33 to the valve 26 for shifting valve 26 from its first centered position 35 to either its second or third positions 37 and 39. Even though valve 26 is shown to be remotely controlled, it is to be understood that the valve can be directly controlled. A relief valve 30 is associated with valve 26 and a reservoir 34.

A conduit 36 is connected to valve 26 and a right brake 38 and a conduit 40 is connected to valve 26 and a left brake 42. Right brake 38 and left brake 42 are both spring applied and pressure released brakes which are well known in the art and shown in the above noted U.S. Pat. No. 4,006,939.

Right and left wheels 44,46 are each driven by a pair of respective axles 48 and 50 by an engine 52 through differential 54. Differential 54 is of the standard type that does not allow all of the torque from the engine to be transmitted to the non-spinning wheel such as is the case with ones having differential lock.

INDUSTRIAL APPLICABILITY

The brake system 10 is particularly suitable for use in a vehicle and allows the operator to selectively apply the brake on a wheel that is spinning but prevents the brake from being fully applied.

During normal braking conditions main valve 12 is actuated by the operator and positions modulation valve 16 to provide a controlled pressure signal to both brakes 38 and 42 through the first position 35 of valve 26. By lowering the fluid pressure signal, the braking force is increased. During normal run conditions the modulatable source pressure is, for example, approximately 3860 kPa (560 psi).

When the vehicle encounters a condition that allows one wheel to spin, the operator moves valve 26 to one of its second or third position 37,39 in response to controllably moving selector valve 28 and supplying pressurized air to either conduit 31 or 33, depending on which wheel is spinning.

If, for example, wheel 46 is spinning, then valve 26 would be moved towards its second position 37 as shown in the drawing. At this position of the valve 26, fully pressurized fluid would be continually delivered to brake 38 while modulating the fluid pressure at brake 42. The controlled fluid pressure may be accomplished at valve 26 or by relief valve 30. Relief valve 30 ensures that the pressure at the brake of the spinning wheel does not go below a preselected pressure, for example, approximately 1050 kPa (152 psi). Consequently, the braking of the spinning wheel is not fully applied.

If, for example, wheel 44 is spinning, then the operator moves valve 26 towards its third position 39 with resultant control of the pressure on the spinning wheel 44, as described above for spinning wheel 46.

By partially applying the brake of the spinning wheel, torque equal to the applied brake torque is transmitted to the ground by the non-spinning wheel. If the selector valve 28 were inadvertently moved during normal roading of the vehicle, the partial braking of one wheel would not create major control problems with the vehicle.

Other aspects, objects and advantages of this invention can be obtained from a study of the drawing, the disclosure, and the appended claims.

We claim:

1. In a vehicle fluid brake system (10) having right and left spring applied, fluid pressure released wheel brakes (38,42), a source of fluid pressure (18), and a brake valve (16) for modulating said source (18) and delivering a controlled pressure signal (20) for simultaneous control of said brakes (38,42), the improvement comprising:

valve means (24) for modulating said controlled pressure signal (20) and independently controlling the degree of engagement of either brake.

2. A system, as set forth in claim 1, wherein said valve means (24) includes means (30) for maintaining one of the brakes (38,42) at a preselected minimum fluid pressure.

3. A system, as set forth in claim 2, wherein said valve means (24) includes a valve (26) connected to said controlled pressure signal (20) and said brakes, said valve (26) being movable between a first position (35) at which said controlled pressure signal is in communication with both of the brakes, a second position (37) at which one of said brakes is connected to said controlled pressure signal and the other of said brakes is controllably connected to said reservoir, and a third position (39) at which said other brake is connected to said controlled pressure signal and said one brake is controllably connected to said reservoir.

4. A system, as set forth in claim 1 wherein said valve means (24) includes a manually shiftable selector valve (28) connected to opposed ends of said valve (26).

5. A fluid brake system, comprising:

a right and left spring applied, fluid pressure released wheel brakes (38,42);

a modulated source of fluid pressure (20) connected to both wheel brakes (38,42);

a reservoir (34);

a selectively actuatable valve (26) in fluid communication with said source (20), said reservoir, and said brakes, said valve (26) being movable between a first position (35) at which said source is directed to said first and second brakes and blocked from said reservoir and a second position (37) at which one of said first and second brakes is connected to said source and the other of said brakes is controllably connected to said reservoir (34).

6. A system, as set forth in claim 5, including a relief valve (30) positioned between said valve (26) and said reservoir (34) and being of a construction sufficient for maintaining one of the brakes at a preselected minimum fluid pressure.

* * * * *